(12) United States Patent
Piggott

(10) Patent No.: US 8,360,406 B2
(45) Date of Patent: *Jan. 29, 2013

(54) CLAMPING DEVICE

(75) Inventor: David C. Piggott, Lakefield (CA)

(73) Assignee: Quickmill, Inc., Peterborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,203

(22) Filed: Apr. 24, 2012

(65) Prior Publication Data

US 2012/0205849 A1    Aug. 16, 2012

Related U.S. Application Data

(62) Division of application No. 12/382,564, filed on Mar. 18, 2009, now Pat. No. 8,177,204.

(60) Provisional application No. 61/064,676, filed on Mar. 19, 2008.

(51) Int. Cl.
*B25B 11/00* (2006.01)
*B23P 11/00* (2006.01)

(52) U.S. Cl. .................. 269/9; 29/595.02; 269/47

(58) Field of Classification Search ........... 269/6, 9, 269/47, 48.1, 49, 50, 52, 89, 101, 289 R; 29/423, 425, 525.02
See application file for complete search history.

(56) References Cited

U.S. PATENT DOCUMENTS

| | | | |
|---|---|---|---|
| 892,333 A | 6/1908 | Traub | |
| 1,785,709 A * | 12/1930 | Campau | 411/368 |
| 1,978,935 A | 10/1934 | Douglas | |
| 2,271,012 A | 1/1942 | Hutchings | |
| 2,963,927 A | 12/1960 | Hanger | |
| 3,202,037 A | 8/1965 | Finkle | |
| 3,747,168 A * | 7/1973 | Snarskis | 411/349 |
| 3,909,907 A | 10/1975 | Davis | |
| 4,372,015 A | 2/1983 | Rhoton | |
| 4,789,287 A * | 12/1988 | Le | 411/107 |
| 4,850,763 A | 7/1989 | Jack et al. | |
| 5,135,341 A | 8/1992 | Leyder | |
| 5,164,154 A | 11/1992 | Brown | |
| 6,722,643 B1 | 4/2004 | Kurtz | |
| 6,827,345 B2 | 12/2004 | Anderson et al. | |
| 2008/0012191 A1 | 1/2008 | Piggott | |

FOREIGN PATENT DOCUMENTS

FR    2919691    2/2004

* cited by examiner

*Primary Examiner* — Hadi Shakeri

(57) ABSTRACT

Disclosed herein is a securing device for plate-like work pieces, comprising a body member and an anchor member, the body member having a first end and a second end, the first end having an engagement portion, a biasing member to basis the body member laterally within a plurality of aligned openings in said work pieces and biasing the engagement portion past the openings, the engagement portion having an operative surface to engage an outer surface on a first outer work piece, the body member including a threadable portion, the anchor member being operable to engage an outer surface on a second outer work piece, the anchor member including a threaded member to engage the threadable portion, the threaded member be rotationally operational to draw the body member toward the anchor member.

12 Claims, 12 Drawing Sheets

CLAMPING DEVICE

REFERENCE TO COPENDING APPLICATIONS

This application is a divisional application of the applicant's co-pending U.S. patent application Ser. No. 12/382,564, entitled "CLAMPING DEVICE," filed Mar. 18, 2009 which is incorporated by reference and, in turn, is related to and claims benefit of priority under Title 35, United States Code section 119(e), to U.S. Provisional application 61/064,676 filed Mar. 19, 2008 and entitled CAMPING DEVICE, which is incorporated herein by reference.

BACKGROUND OF THE INVENTION

1. Field of the Invention

This invention relates in general to devices and methods for securing groups of two or more work pieces during machining.

2. Description of the Related Art

The precision machining of large work pieces, such as plate-like work pieces, requires the use of a wide array of machine tools such as gauges, templates, cooling systems, hydraulic clamps, and drill-sets. These tools are expensive to acquire and maintain.

Large work pieces, such as steel plates, are typically manufactured using a large gantry milling machine. In one conventional system, steel plates are stacked on a milling table and clamped at regular locations along their aligned peripheries so not to interfere with the machining process, which may involve one or more milling and/or drilling steps. A gantry is configured to move along tracks that extend parallel to the work pieces, such that the gantry provides an overhead tool head to support for one or more machining tools. The gantry may be adjusted along the length of the work pieces, and the tool head may be adjusted along x, y and z axes relative to the work pieces to machine the work pieces. As the process proceeds, there is a tendency of bulging between the work pieces as material shavings force themselves in between the work pieces. This problem is more pronounced as the size of the work pieces increase, the amount of machining that is done on the work pieces and as the distance from the clamped peripheral edges increases. For example, the problem may be come acute when the machining step occurs in a central region of these work pieces.

What is needed is a novel approach to clamping such work pieces.

BRIEF DESCRIPTION OF THE DRAWINGS

Several exemplary embodiments of the present invention will now be described, by way of example only, with reference to the appended drawings in which.

DETAILED DESCRIPTION

Figure 1:
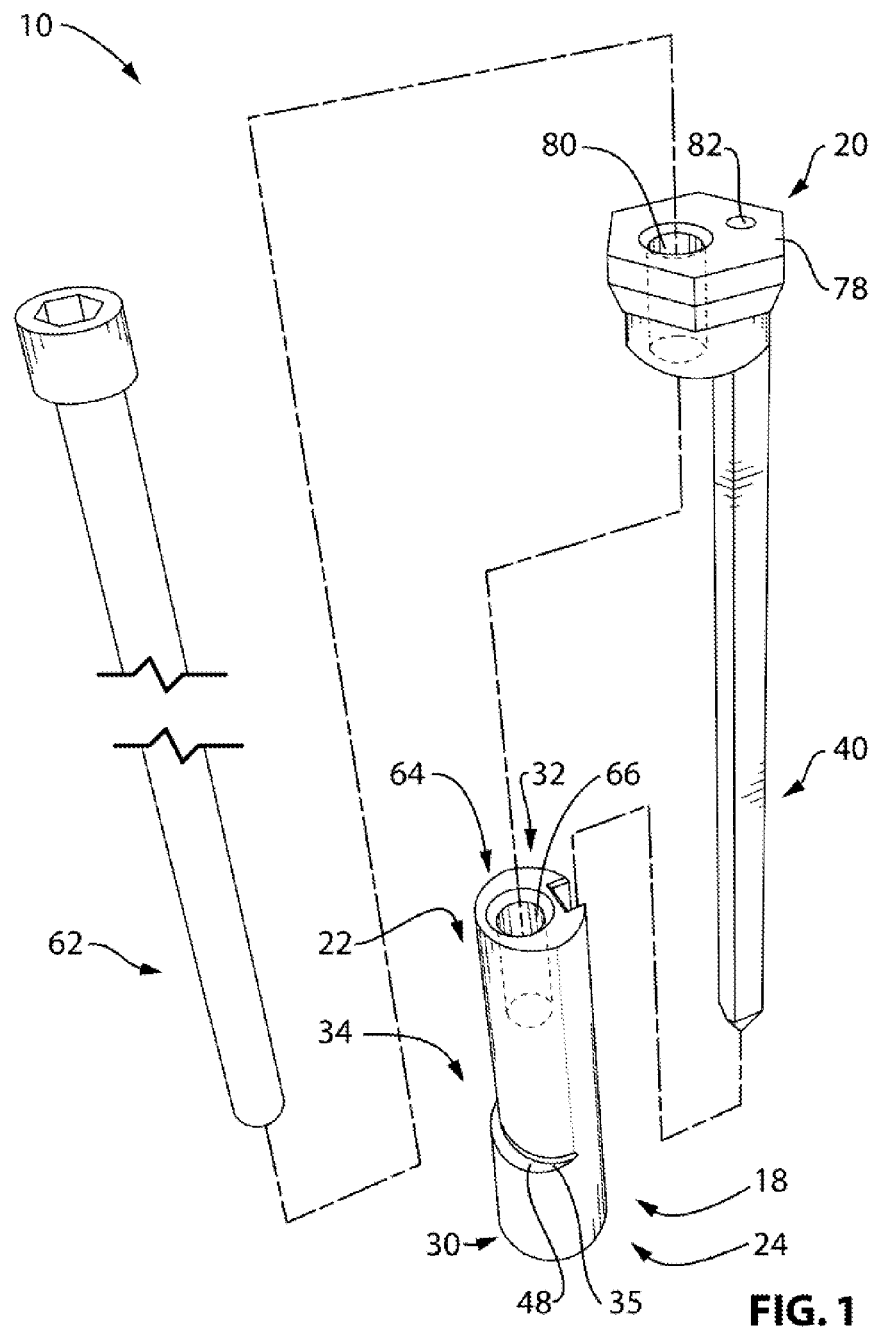
FIG. 1 is a perspective view of a clamp device.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

In an exemplary embodiment, there is provided a device for clamping a grouping of two or more work pieces, each having an opening with the openings being aligned in the grouping to form a pathway with a lateral boundary. The device comprises a body member and an anchor member. The body member has a first end and a second end, the body dimensioned to travel along the pathway. The body includes an engagement portion between the first and second ends. A displacement member is also provided which is dimensioned to extend into the pathway adjacent the body to displace the body member laterally within the pathway to an offset orientation in which the engagement portion is adjacent to and aligned with an outer surface on a first outer work piece of the grouping of work pieces. The body member also includes a threadable portion. The anchor member is operable to be located adjacent a second outer work piece of the grouping of work pieces. A threaded member is also provided to extend between the anchor member and the threadable portion to be threadably engaged therewith. The threaded member is rotationally operable to draw the body member toward the anchor member to establish a clamping force therebetween.

In some exemplary embodiments, the body member includes a first reaction surface and the displacement member has a second reaction surface. The body and displacement members have complementary profiles to allow sliding engagement of the first and second reaction surfaces. In one example, the body member includes a channel with the first reaction surface defined centrally therein. The first reaction surface and/or the second reaction surface may include at least one treatment to reduce friction. The treatment may include a friction-reducing material. The treatment may include the provision of an o-ring located in the first reaction surface. The treatment may include a surface portion of more layers of plastics, metals, natural or synthetic rubbers and/or oils.

In some exemplary embodiments, the displacement member is square or rectangular in cross section.

In some exemplary embodiments, the threaded member extends through a passage formed in the anchor member. In one example, the threaded member is a bolt.

In some exemplary embodiments, the displacement member is coupled with the anchor member.

In some exemplary embodiments, the engagement portion includes a peripheral lateral lip and in some cases is positioned on the body member opposite to the channel.

In some exemplary embodiments, the body member has a first body portion and a second body portion, where the second body portion being of larger diameter than that of the first body portion. The engagement portion, in one case, include an engagement surface positioned between the first and second body portions, the engagement surface being inwardly inclined from an outer periphery thereof. The body member has an outer side wall and the engagement surface meeting the side wall at a recessed region therein.

In another exemplary embodiment, there is provided a method of clamping plate-like work pieces comprising:
- assembling individual plate-like work pieces into a stack on a work surface while leaving a gap between the stack and the work surface;
- clamping an outer region of the plate-like work pieces;
- drilling at least one passage through the stack with a first end located adjacent a first work piece proximal to the work surface and a second end located adjacent a second work piece distal to the work surface;
- providing a clamping device including a first anchor portion, a body portion having a second anchor portion, a transfer member, and a threaded member, the threaded member being and operable to engage the first anchor portion and the body portion;
- delivering the body portion through the passage to a first orientation beyond the first end of the passage;
- inserting the transfer member to engage the body portion for laterally transferring the body portion within the passage to extend the second anchor portion in an offset position relative to the passage thereby to place the second anchor portion in an operative position adjacent the first outer plate member;
- aligning the first anchor portion with the passage against the second outer plate member;
- extending the threadable member between the first anchor portion and the body portion;
- rotating the threadable member to draw the body portion toward the first anchor portion, thereby to establish a clamped arrangement between the first and second anchor portions and the first and second work pieces.

In some exemplary embodiments of the above mentioned method, the transfer member is fixed with the first anchor portion, wherein the step of inserting the transfer member includes orienting the first anchor portion to be centrally located in the passage to align the first anchor portion, the biasing member and the body portion.

In another exemplary embodiment, there is provided a method for clamping a grouping of two or more work pieces, each with an opening, with the openings combining to form a pathway through the work pieces. The method includes introducing at one end region of the pathway a body member with an engagement portion extending laterally outwardly therefrom. Next, a brace element is located between the body member and a boundary of the pathway to brace the body member against an opposite boundary of the pathway and in the direction of the engagement portion, sufficient to align the engagement portion with an outer surface portion of a first work piece at one edge of the grouping. An anchor portion is then located against a second work piece at an opposite edge of the grouping and adjacent a second opposite end region of the pathway. A threaded member is then extended between the body member and the anchor portion and threadable engaged with the body member. Next the threaded member is rotated to draw the body member toward the anchor member, with sufficient force to clamp the work pieces.

In another exemplary embodiment, there is provided a kit for clamping a group of work pieces together. The kit comprises a body and an anchor member. The body has a first portion of a first diameter and a second portion of a second larger diameter. The body is dimensioned to pass through a path formed by aligned passages in the group of work pieces. A transfer portion is operable to transfer the first portion laterally within the path to place the second portion in an operative position adjacent a first contact surface on a first outer work piece. The body has a threaded passage. The anchor member is arranged to lie against a second contact surface of a second work piece of the group. A plurality of threaded members of varying lengths are provided, each configured to engage the threaded passage, while each of the threaded members are rotatably operable to draw the body member toward the anchor member. The kit also provides a set of instructions on a use thereof.

Figure 2:
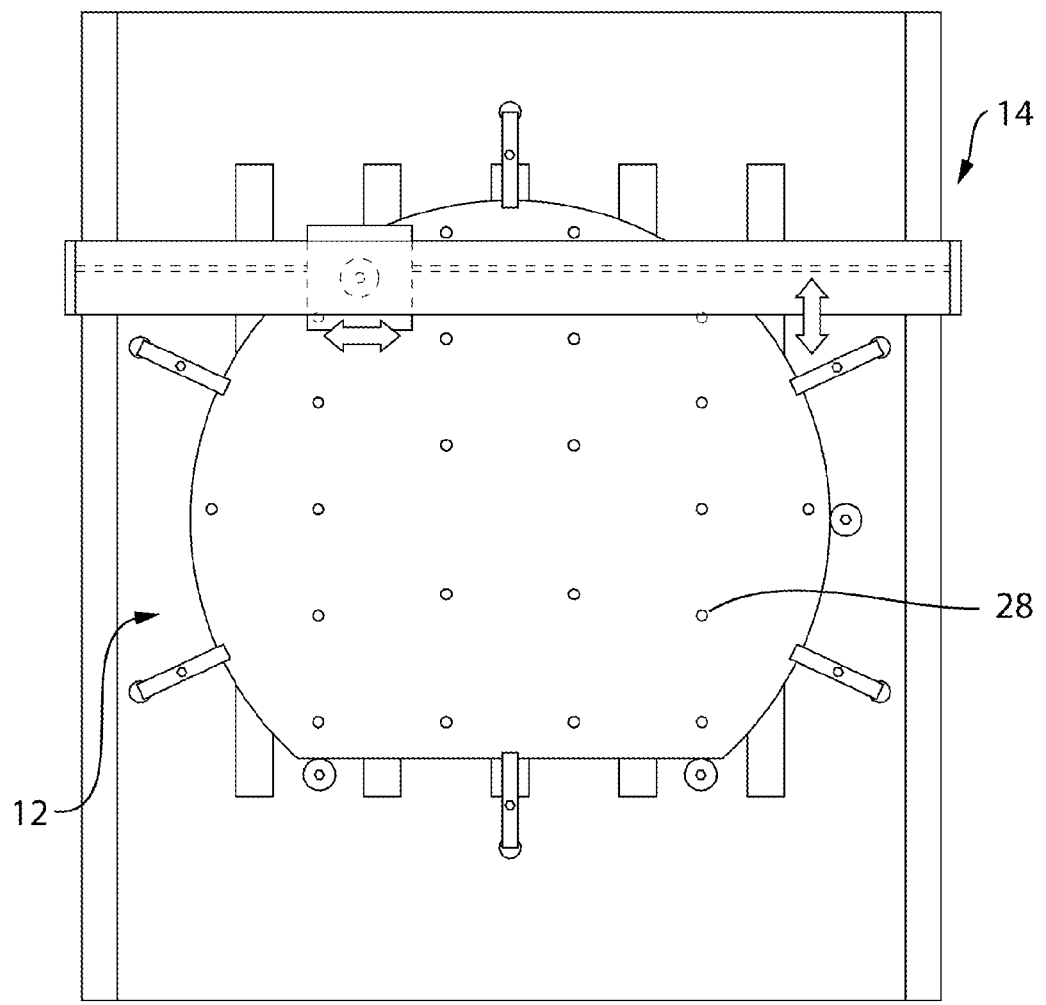
FIG. 2 is a plan view of a gantry milling machine.

Referring to the FIGS. 1 and 2, there is provided a securing or clamping device 10 for a grouping of plate-like work pieces 12 together. As shown in this example the work pieces 12 are provided in the form of a stack or grouping of sheets in an operative position on a gantry milling machine 14. The work pieces may be of equal or unequal dimensions and, in some cases, not be plate-like.

Figure 4:
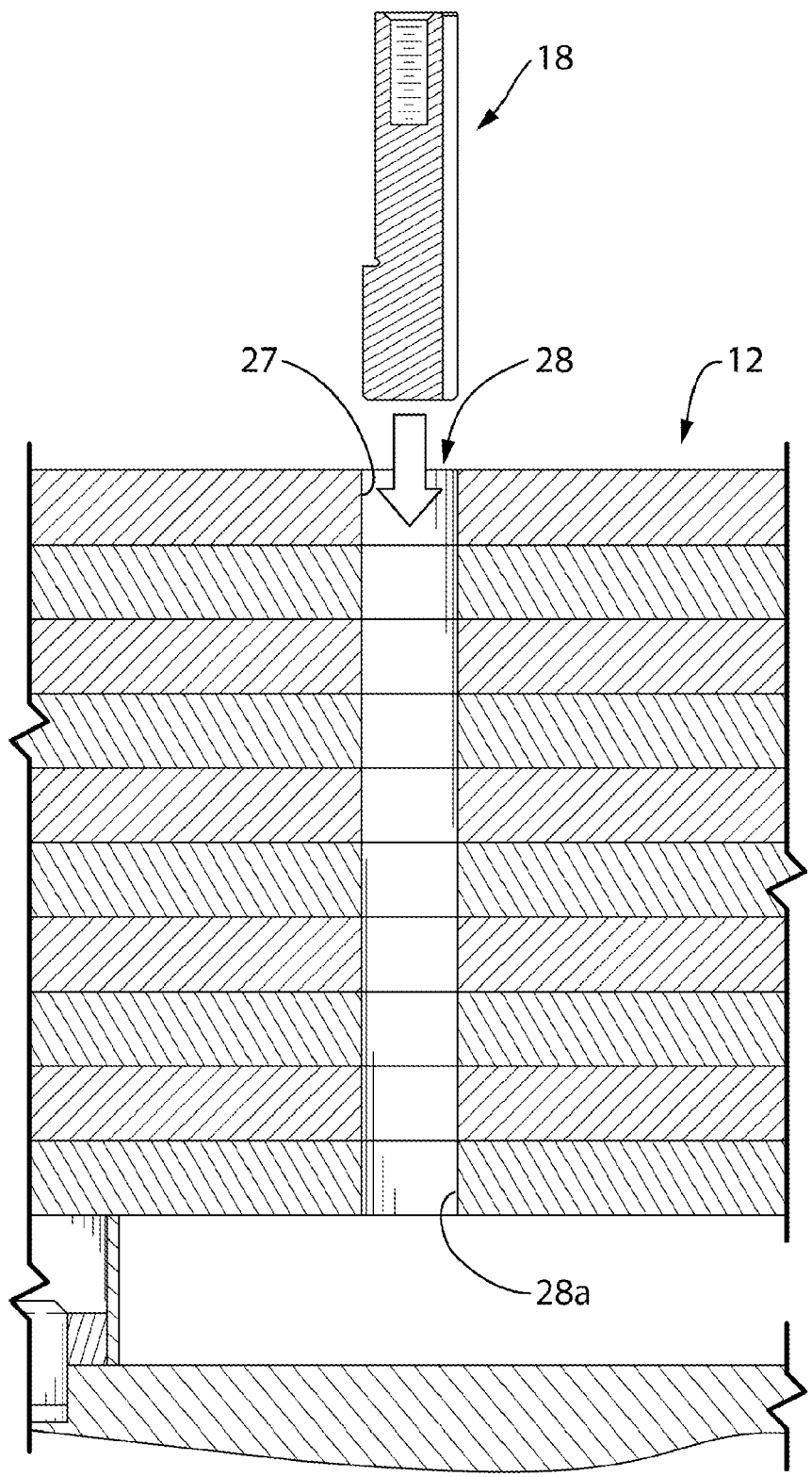
Figure 5:
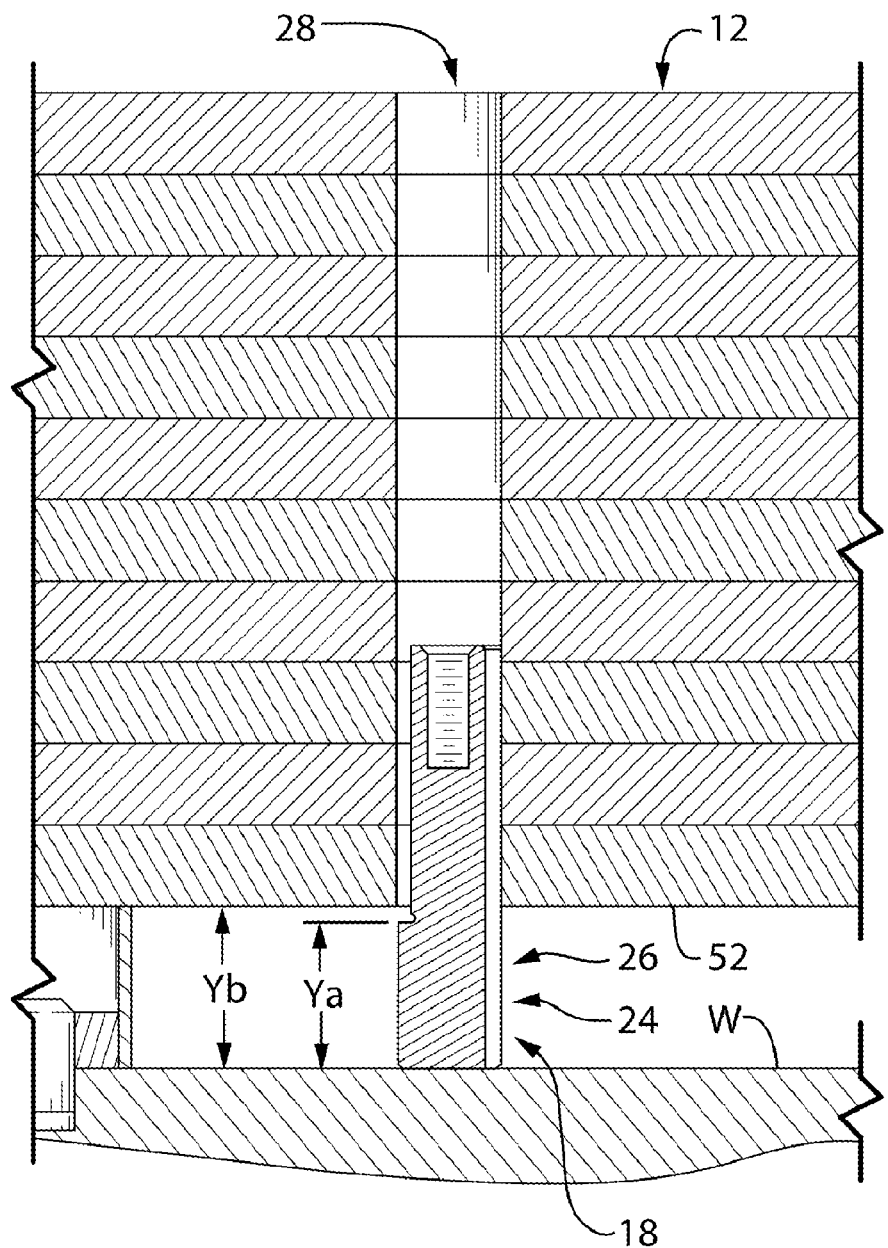
Figure 6:
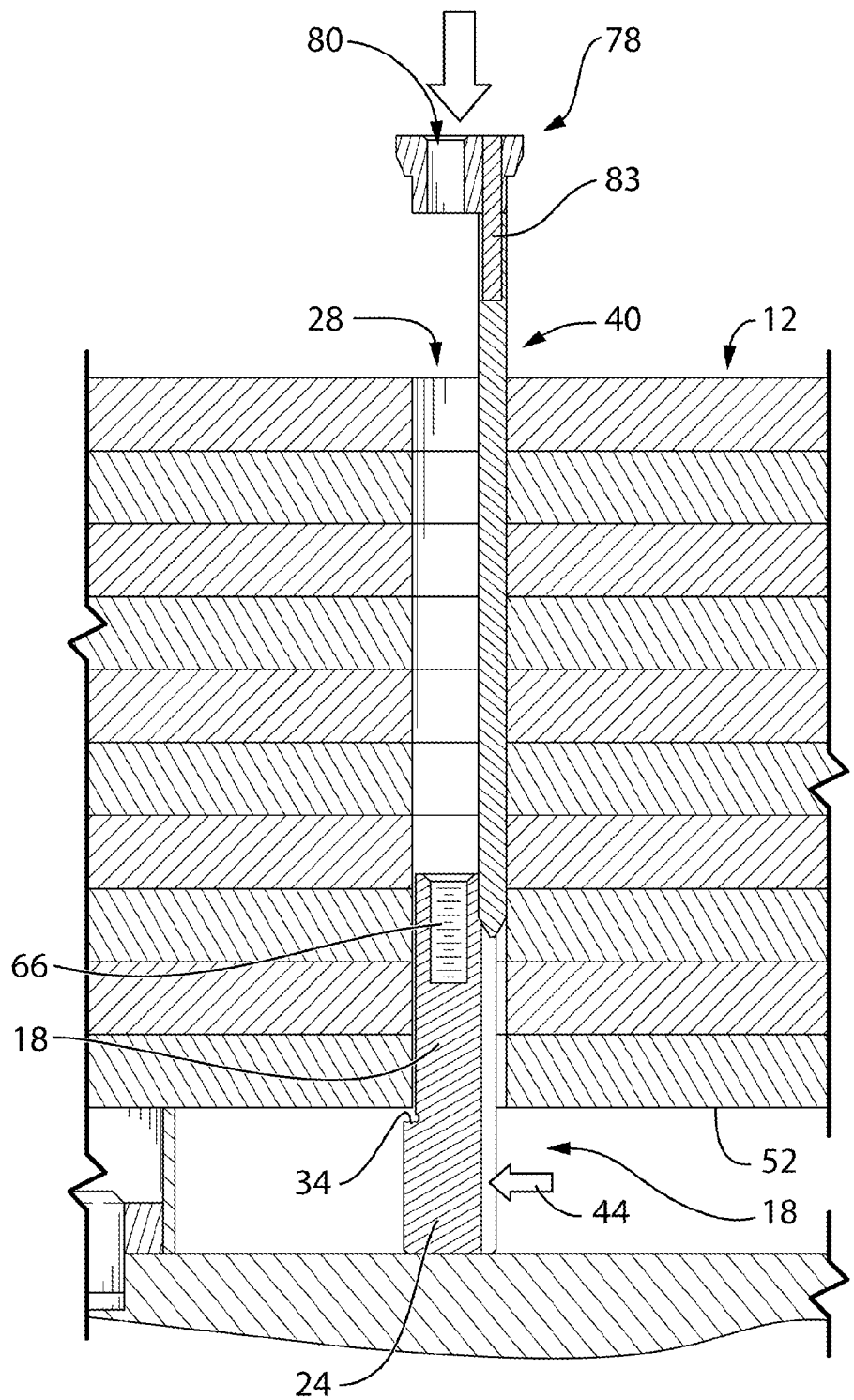
Figure 7:
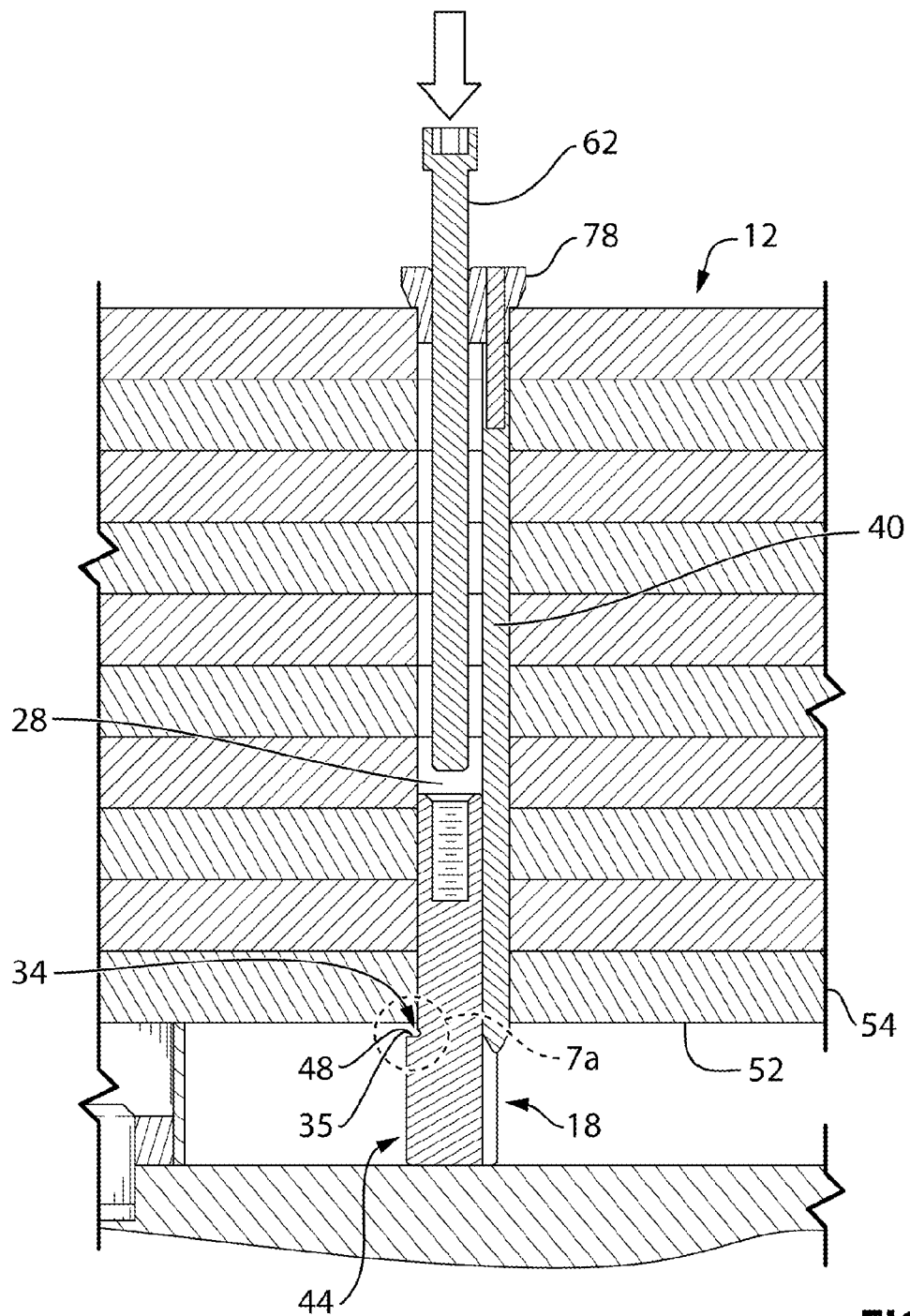
Figure 7A:
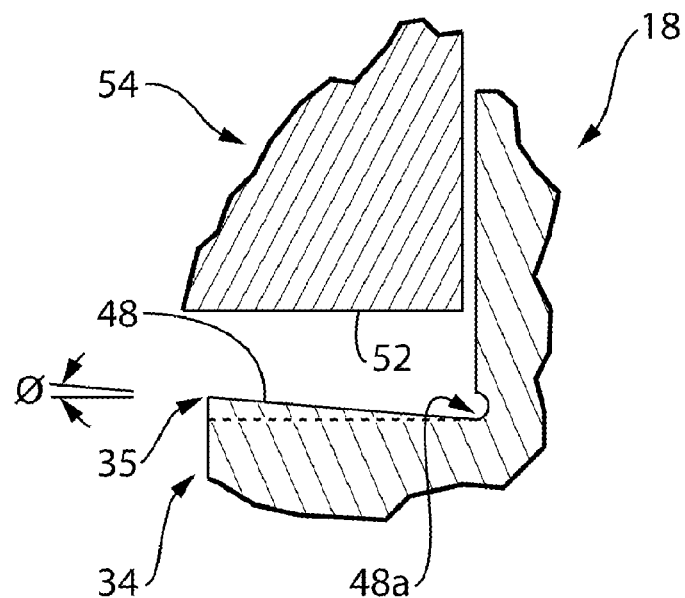
FIG. 7a is a magnified cross-sectional view of according to circle 7a of FIG. 7.
Figure 7B:
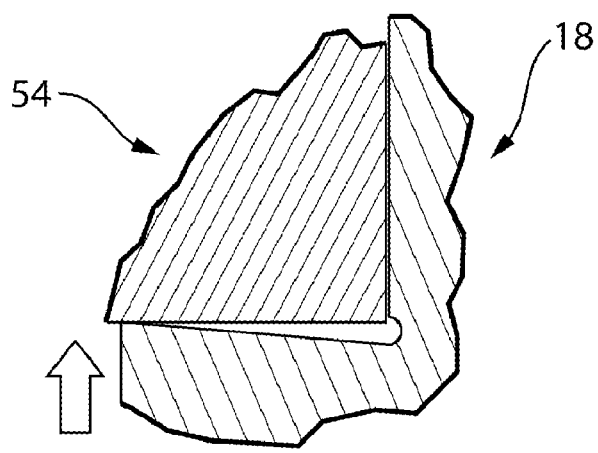
FIG. 7b is a magnified cross-sectional view of according to circle 7b of FIG. 8.
Figure 8:
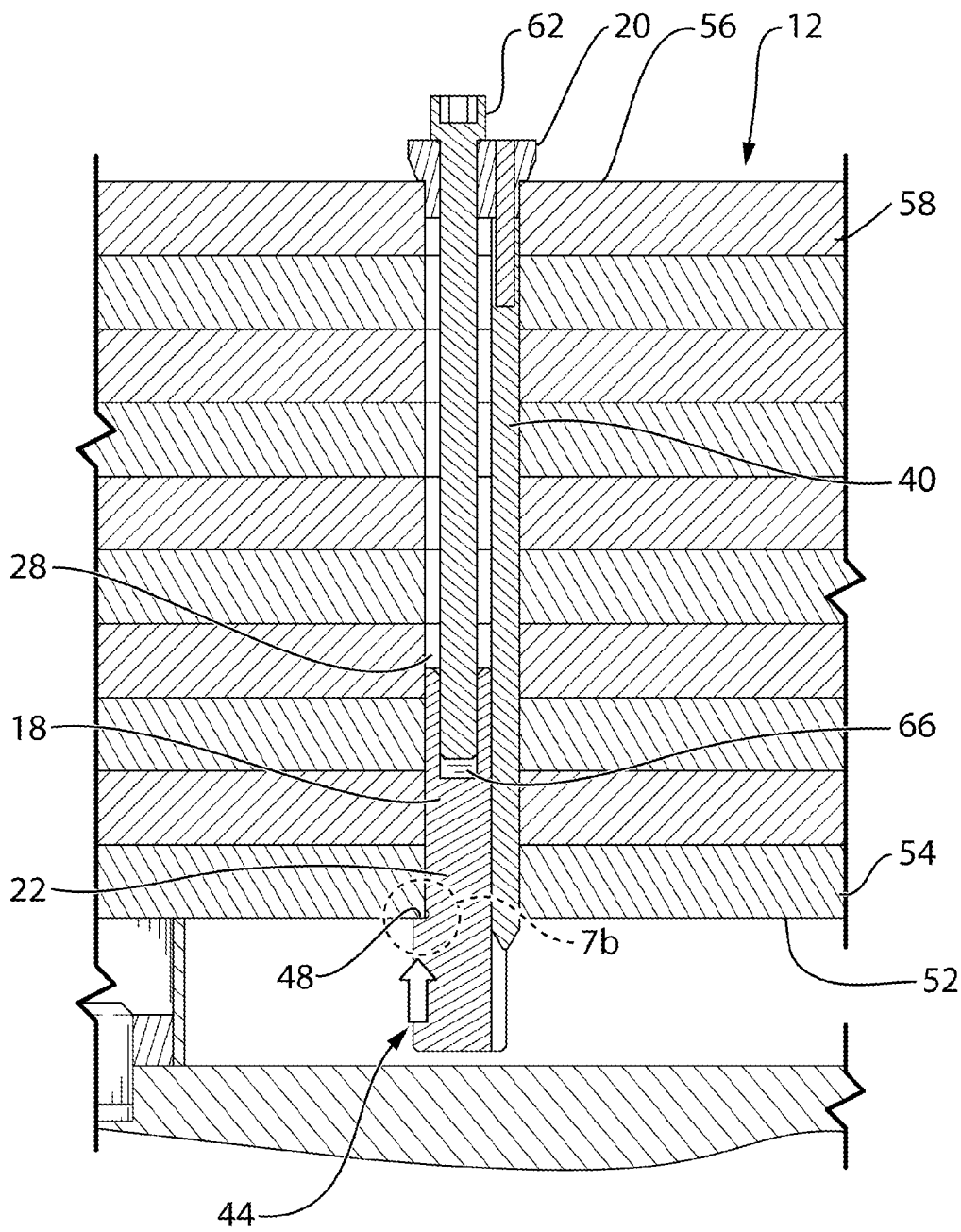
FIG. 8 is cross sectional view of the stack of work pieces and the clamp device or FIG. 7 in a subsequent operative position.

In this example, the device 10 has a generally cylindrical body member 18 and an anchor member 20. The body member 18 has a first portion 22 of a first diameter and a second portion 24 of a second larger diameter. As illustrated in FIGS. 4 and 5 the body member 18 is operable in a first orientation 26 to travel through a plurality of aligned passages 27 in the work pieces 12, forming a pathway 28 with a boundary 28a, as shown in FIG. 4. Now referring to FIG. 1, the body member 18 has a first end 30, a second end 32 and an engagement portion 34 therebetween. As illustrated in FIGS. 6 and 7 a displacement or biasing member 40 is provided to displace or bias the body member 18 laterally within the pathway 28 to a second orientation as shown by arrow 44. The second orientation presents the engagement portion 34 beyond the boundary 28a as seen in FIGS. 7 and 8. Referring to FIGS. 7, 7a and 7b, the engagement portion 34 has an engagement surface 48 to engage a first (or lowermost) outer surface 52 on a first (and lowermost) outer work piece 54. It can be seen that the engagement surface 48 is formed on a peripheral lateral lip 35. The engagement surface 48, in cross section, can be seen to extend from an outer edge of the peripheral lateral lip 35 to an inner location and terminating at an inner recessed region 48a extending into the body member 18. The inner recessed region 48a, in some cases, may enhance the engagement with the work piece by providing a space for a neighboring corner section 52a of the work piece 54. The engagement surface 48 may be inclined downwardly away from its peripheral edge toward the inner recessed region, as established by the angle of inclination theta, ranging from about 1 to about 10 degrees, for instance, in its orientation as seen in FIGS. 7a and 7b to add additional "bite" into the first outer surface 52 of the outer work piece 54, as shown in FIG. 7b.

Referring to FIGS. 1 and 8, the anchor member 20 is operable to engage a second (or uppermost) outer surface 56 on a second (or uppermost) outer work piece 58. A threaded member 62 extends through the anchor member 20 to engage a threadable portion 64 (as shown in FIG. 1) by way of an inner threaded passage 66 within the body member 18. The threaded member 62 is rotationally operable to draw the body member 18 toward the anchor member 20 and, in so doing, clamp the work pieces together between the anchor member 20 and the body member 18 as shown in FIG. 8.

As illustrated in FIGS. 1 and 6, the biasing member 40 is square or rectangular in cross section, but may be round, triangular or of other configurations, as desired. The biasing member 40 is symmetrical along its length and is pointed at its distal end. In another example, the biasing member 40 may be tapered to assist in the transfer of the body member 18 between the first and second orientations 26 and 28 respectively.

Figure 9:
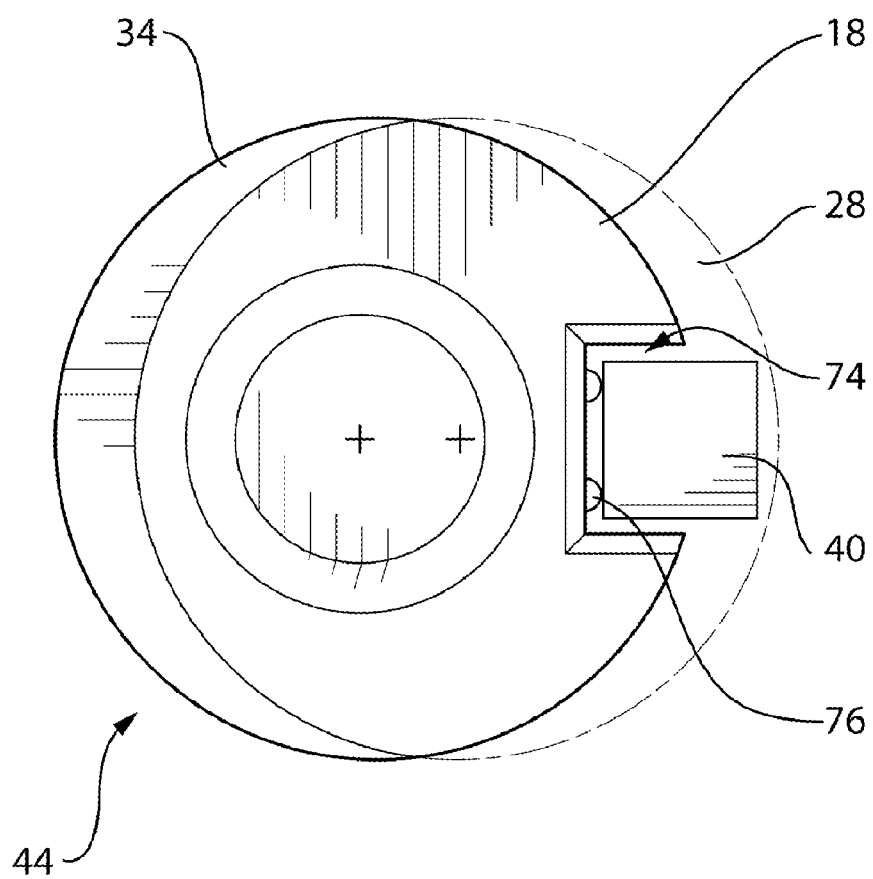
FIG. 9 is a plan view of a portion of the device of FIG. 1.

As shown in FIG. 9, the body member 18 has a channel 74 to receive the biasing member 40. In this case, the pointed distal end of the biasing member 40 aids in positioning the biasing member 40 in the channel 74. The channel 74 is rectangular in cross section, but may be square, round, triangular or a combination thereof to complement the biasing member 40. The channel 74 may similarly be tapered to assist the biasing member 40 in the transfer of the body member 18. The channel 74 may be cut into the body member 18 or added to the exterior thereof. If desired, the channel may be provided with formations to reduce friction between the body member 18 and the biasing member 40. This may include a plurality of resilient bumpers or the like as shown at 76, as may be provided by way of one or more o-rings or the like. Alternatively, a low friction layer may be provided on either the body member 18, the biasing member 40 or both at the intersection there between, such as one or more layers of plastics (such as those available under the trade names NYLON and TEFLON and others with similar properties therewith), metals, natural or synthetic rubbers, oils or the like. The channel may also be replaced by other formations on the body member as desired to provide a reaction surface against which a corresponding reaction surface on the basing member may act to transfer the body member, and to provide the body member and biasing member with complementary profiles to permit the sliding engagement of their respective reaction surfaces.

Referring to FIG. 1, the anchor member 20, in this example, is a cap 78, although other configurations may be used, for example, a disk, bar, or wedge in shape that may sit fully within the pathway or entirely outside the pathway 28. In this example the cap 78 has a hole 80 to receive a threaded member 62. The anchor member 20 includes a hole 82 for fixing the biasing member 40 to the under side of the cap 78 by way of pin or fastener 83, as shown in FIG. 6. The fixing of the biasing member 40 to the cap, in this example, means that the cap may be used to deliver the biasing member to the channel in a convenient manner while the cap aids in aligning the biasing member and the body with the cap prior to the clamping process. If desired, the cap 78 and the threaded member 62 may be affixed, while providing swiveling action for the threaded member 62, as desired. Further, the cap 78 may receive the biasing member directly in the hole 82.

Referring to FIG. 8, the biasing member 40 and the first portion 22 in their operative positions may have a combined lateral dimension about equal to but not exceeding the diameter of the plurality of aligned passage 28 in the works pieces 12. Thus, the clamp device, in this example, derives its clamping ability, first by delivering the biasing member to an operative position in the channel which has the effect of pressing the biasing member between the boundary of the pathway 28 and the body member 18, thus shifting or transferring the body member laterally, and then, second, by drawing the body member toward the cap 78 to form a clamping force generated between the cap 78, the threaded member 62, the body member 18 and the work pieces 12.

Figure 11:
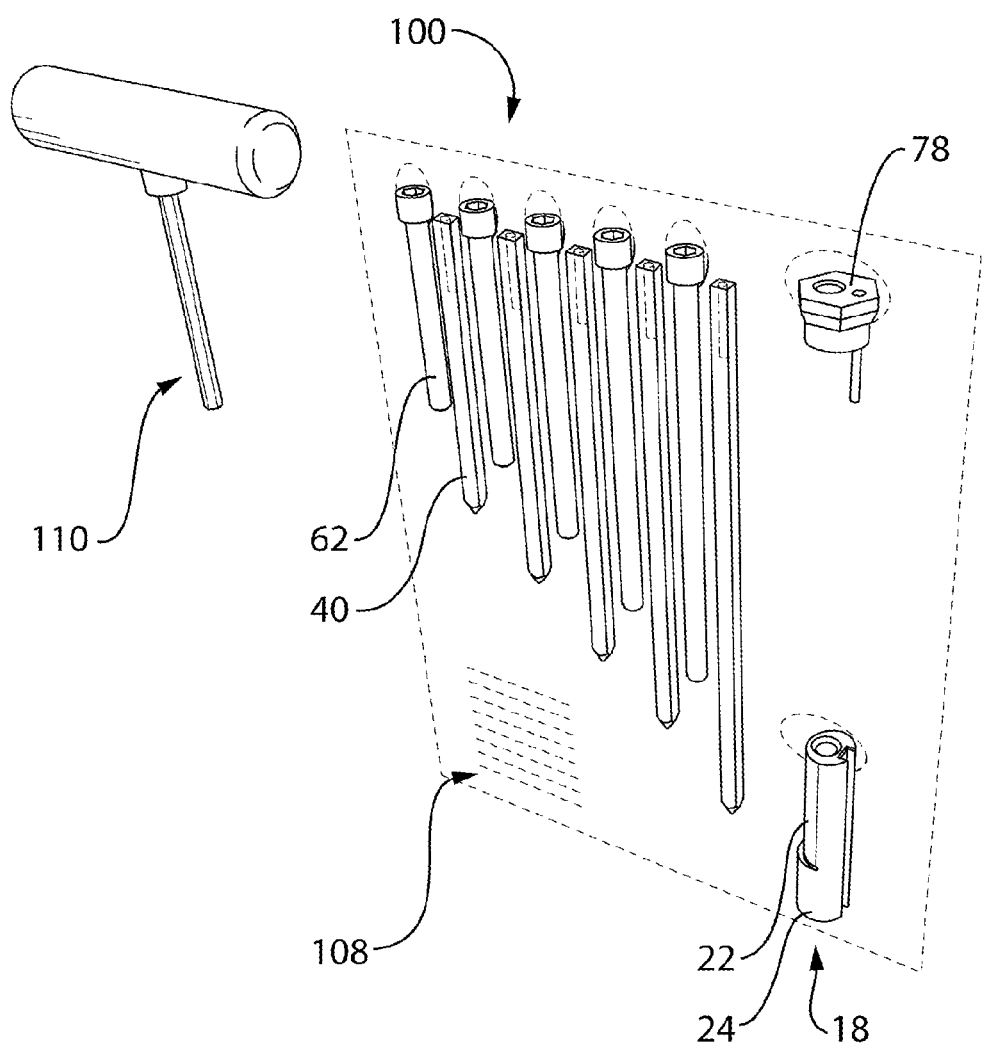
FIG. 11 is a perspective view of a kit utilizing the device of FIG. 1.

As shown in FIG. 11, the device may be provided in the form of a kit 100. In this example, there is provided a body member 18 and an anchor member, in this example the cap 78, although the kit may be provided with several body members and anchor members for several assemblies. The kit 100 has several biasing members 40 and threaded members 62 to clamp the work pieces together. In this case, the plurality of threaded members 62 and biasing members 40 are conveniently provided of various lengths, each operable to be arranged to engage the body portion and the cap, though the kit may only need a single threaded member 62 and a single biasing member 40 for a specific application, as desired. The different lengths of the biasing member and the threaded member allow for the kit to be used for different numbers and different dimensions of work pieces where the effective length of the pathway 28 varies by the number and thickness dimensions of the work pieces. The kit, in this example, also includes an instructional manual 108 for instructing a user how to assemble the body member 18 and cap 78, how to use the biasing member, how to choose the appropriate length of the threaded member and/or how to disengage the body member and the cap from the work pieces. In this case, the desired length of the threaded member and the biasing member may be selected by considering the overall length of the pathway, to allow that the biasing member is sufficiently long to engage the channel sufficiently to provide sufficient clamping of the body member against periphery of the pathway, and the threaded member to engage the threadable portion to deliver sufficient clamping forces thereto. The kit 100, in this case, includes a tool 110 to engage and rotate the threaded members 104, though the kit 100 may be provided without the tool 110, it being understood that the user may have a manual or power tool on hand to do the job.

Figure 3:
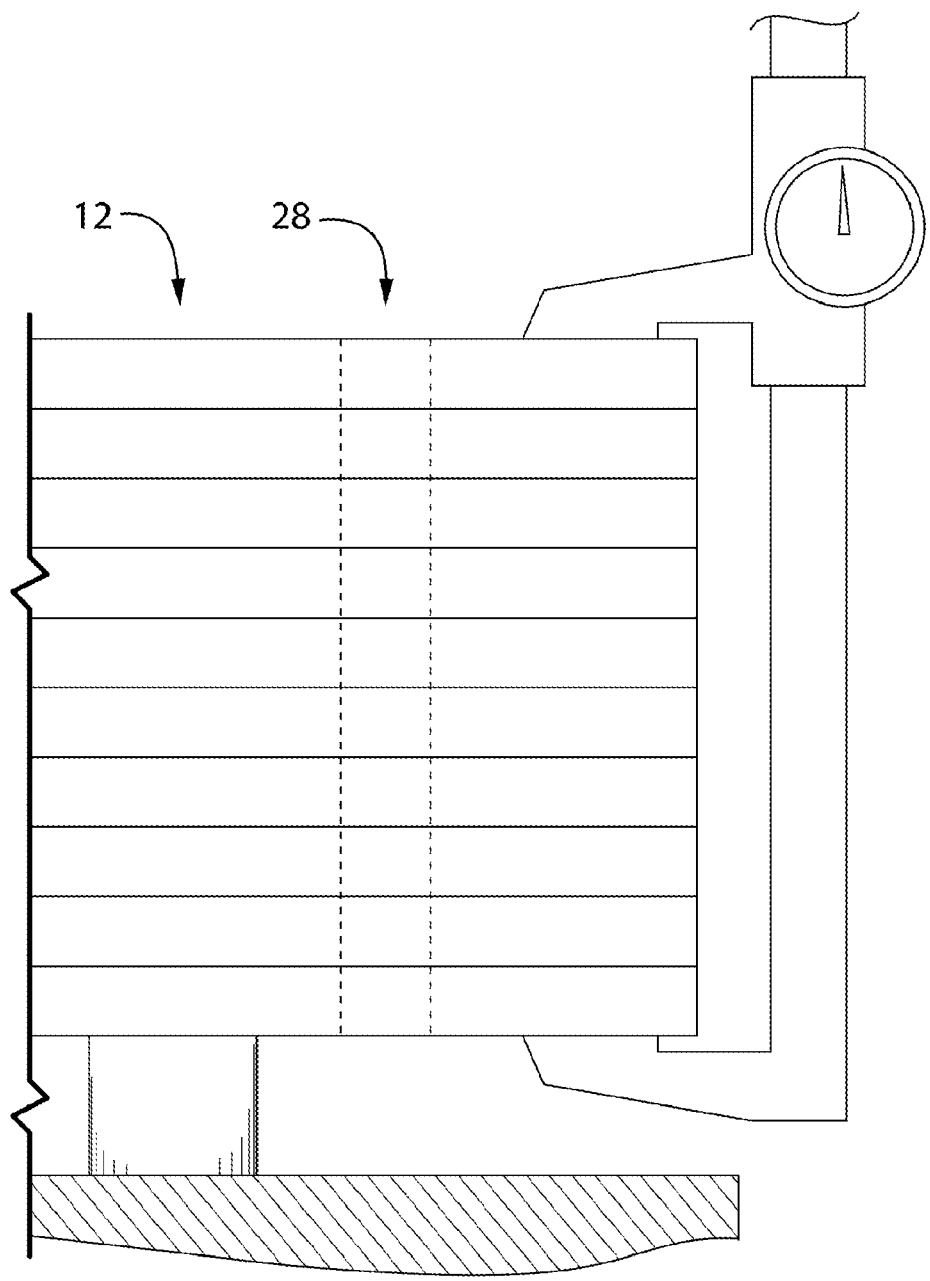
FIGS. 3 through 7 inclusive are side views or cross-sectional views of a stack of work pieces, in some cases including the clamp device or portions thereof in operative positions.

The device 10 in FIG. 1 may thus be used, in one example, in the following manner. First, as shown in FIGS. 2 and 3, the user assembles individual plate-like work pieces into the stack and supports the stack, for example by way of the supports disclosed in U.S. non-provisional patent application Ser. No. 12/213,588 filed Jun. 20, 2008 and entitled WORK PIECE SUPPORT, the entire subject matter of which is incorporated herein by reference, though other supports may also be used if desired. The user clamps an outer region of the plate-like work pieces in a manner which will not interfere with a subsequent machining operation as shown in FIG. 2. The user then drills at least one hole or passage 28 through the stack 12, and measures the height of the stack 12 to determine the appropriate length of threaded member 62 required as shown in FIG. 3. As an alternative to the measurement step, the user may calculate the height of the stack by knowing the height dimension along the pathway 28 (or thickness) of each individual work piece. In this case, if the work pieces are a common thickness, the height may then be determined by multiplying the thickness of a single work piece by their number in the stack.

Now, with reference to FIG. 1, the user then assembles the device 10 with the cap 78, the body member 18, the biasing member 40 and the threaded member 62 of appropriate length. Referring to FIGS. 4 and 5, the user then inserts or otherwise transfers the body member 18 through the pathway 28 to the first orientation 26 on the work surface of the gantry mill 14 as illustrated in FIGS. 4 and 5. Thus, in the position of FIG. 5, it is important that the second portion 24 have a vertical dimension "Ya" which is smaller than the spacing of the lowermost surface and the work surface W, as shown by arrow "Yb". As illustrated in FIG. 6, the biasing member 40 is inserted into the pathway 28 to engage the body member 18 for laterally transferring of the body member within the pathway 28 to engage the pathway and/or at a sufficient distance to expose the engagement portion 34 past the first outer plate member 54 to engage a first outer surface 52 thereon as shown in FIGS. 7 and 8.

The user then aligns the cap 78 so that its periphery seats within the pathway 28 and against the second contact surface 56. As illustrated in FIGS. 7 and 8, the user then rotates the threadable member 62 to draw the body member 18 toward the cap 78 secure or clamp the stack of work pieces 12.

Figure 10:
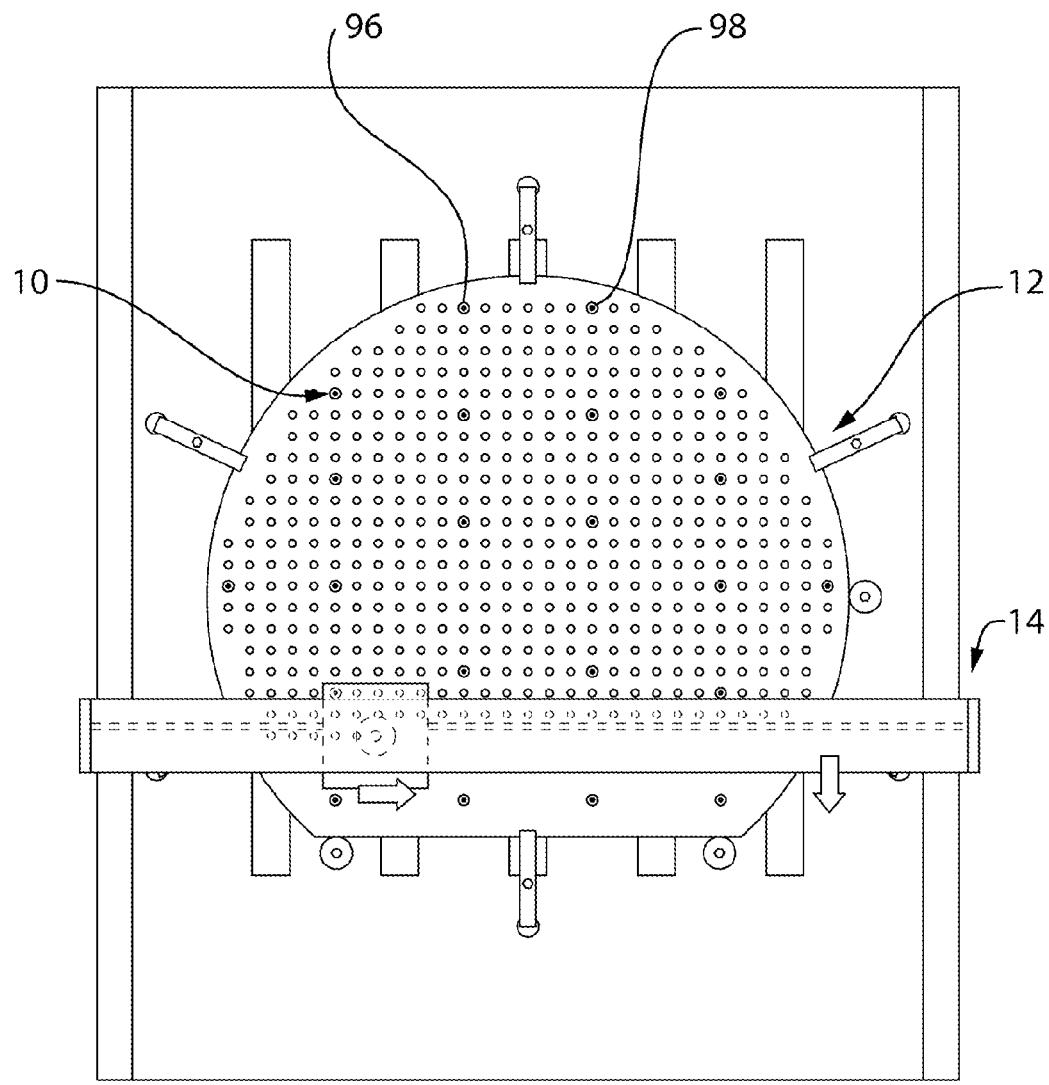
FIG. 10 is a plan view of a gantry milling machine installation including a plurality of clamps of FIG. 1.

The user may then repeat this process for as many devices as needed in the stacked work pieces 12. This may involve installing a first device in a first location (as for example shown at 96 in FIG. 10) on the stack and then subsequently carrying out a number of machining steps at a predetermined vicinity of the first location and then installing a second device at a second location (as for example shown at 98 in FIG. 10) and repeating the process.

Alternatively, the user may pre-drill a number of strategic locations on the stack and then pre-install a device at each of the strategic locations so that all the following machining steps, such as the boring of a hole in the stack, may be carried out in a corresponding succession of machining steps.

In this case, for this particular use of the device 10 (among other possibilities uses of thereof) the materials used in the formation of the threaded member 62, the body member 18 and anchor member 20, should be sufficient to withstand the necessary loads thereon to offset the drive forces which are otherwise applying force to the shavings against the inner surface of the aligned passage, which would otherwise cause the stack to bulge or delaminate.

When the machining operation is complete, the user rotates the threaded member 62 to release the device 10 from the stack and thus withdraw the body member 18 out of the pathway 28. The user may then disassemble the plate-like work pieces from the stack, as desired.

While device is discussed with reference to holes formed in work pieces, the latter may be configured in other ways to accept the device, such as by way of slots, gaps, inner corners and the like. While the device and method herein are discussed with respect to an inner path formed by the aligned passages in the work pieces, there may be some instances where the passages may not be aligned but may be of other configurations, such as offset, while still enabling a version of the device to be used successfully to clamp the work pieces. The inner passages may also be of different dimensions. For instance, the outer plate members may have relatively smaller passages while the adjacent inner plate members may have larger passages. While the biasing member is, in one example, fixed to the anchor member, the biasing member may, in other cases, not be fixed to the anchor member, but may be slidably or otherwise engaged therewith.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method for clamping a grouping of two or more work pieces, each with an opening, with the openings being aligned to form a pathway through the work pieces, the method comprising introducing at one end region of the pathway a body member with an engagement portion extending laterally outwardly therefrom;
   locating a biasing element between the body member and a boundary of the pathway to bias the body member against an opposite boundary of the pathway and in the direction of the engagement portion;
   aligning the engagement portion with an outer surface portion of a first work piece at one edge of the grouping;
   locating an anchor member against a second work piece at an opposite edge of the grouping and adjacent a second opposite end region of the pathway;
   extending a threaded member between the body member and the anchor member;
   threadably engaging the body member and the anchor member via the treaded member;
   rotating the threaded member so to draw the body member toward the anchor member wherein the body member is displaced laterally by the engagement of the biasing member between the anchor portion and the body member such that the engagement portion engages the outer surface portion of the first work piece at the one edge with sufficient force to clamp the work pieces between the engagement portion and the anchor member.

2. The method as defined in claim 1, wherein the biasing member is tapered so as aid in the lateral displacement of the body member as the body member and the anchor member are drawn towards one another by way of rotation of the treaded member.

3. The method as defined in claim 1, wherein the body member includes a channel, the method further comprising locating the biasing member in the channel.

4. The method as defined in claim 3, wherein the biasing member includes a pointed distal end region for aiding in locating the biasing member in the channel and positioning the biasing member between the body member and the boundary of the pathway.

5. The method as defined in claim 3, wherein the channel is tapered so as to aid in displacing the body member laterally as the body member and the anchor member are drawn towards one another by way of rotation of the treaded member.

6. The method as defined in claim 3, wherein the biasing member or the channel or both the biasing member and the channel include a low friction layer.

7. The method as defined in claim 1, wherein the biasing member includes a pointed distal end region for aiding in locating the biasing member between the body member and the boundary of the pathway.

8. The method as defined in claim 1, wherein the biasing member includes a low friction layer.

9. The method as defined in claim 1, wherein the anchor member comprises cap for engaging the second opposite end region of the pathway, the method further comprising seating a portion of the cap in the second opposite end region of the pathway.

10. The method as defined in claim 9, wherein the biasing member is coupled to the cap and seating the cap in the second opposite end region of the pathway aids in locating the biasing member between the boundary of the pathway and the body member.

11. The method as defined in claim 9, wherein the cap further includes a hole and comprises passing the threaded member through the hole so as to aid in locating and threadably engaging the threaded member in the body member.

12. A kit for clamping a group of work pieces together, comprising a body and an anchor member, the body having a first portion of a first diameter and a second portion of a second larger diameter, the body being dimensioned to pass through a path formed by aligned passages in the group of work pieces, a biasing member operable to transfer the first portion laterally within the path to place the second portion in an operative position adjacent a first contact surface on a first outer work piece, the body having a threaded passage, the anchor member being arranged to lie against a second contact surface of a second work piece of the group; a plurality of threaded members of varying lengths, each configured to engage the threaded passage and each of the threaded members rotatably operable to draw the body member toward the anchor member, and a set of instructions on a use thereof.

* * * * *